United States Patent [19]

Creasy

[11] 4,283,456
[45] Aug. 11, 1981

[54] PERMEATION RESISTANT COVERING MATERIAL

[75] Inventor: Walter Creasy, Bridgewater, N.J.

[73] Assignee: GAF Corporation, New York, N.Y.

[21] Appl. No.: 107,206

[22] Filed: Dec. 26, 1979

[51] Int. Cl.³ .................. B32B 5/18; B32B 17/10; B32B 19/08; B32B 27/30

[52] U.S. Cl. .................................... 428/282; 428/285; 428/286; 428/315; 428/518; 428/520

[58] Field of Search .............. 428/313, 315, 442, 522, 428/518, 280, 282, 284, 285, 286, 310, 443, 520

[56] References Cited

U.S. PATENT DOCUMENTS

| | | | |
|---|---|---|---|
| 3,293,094 | 12/1966 | Nairn et al. | 428/159 |
| 3,408,248 | 10/1968 | Maass | 428/159 |
| 3,458,337 | 7/1969 | Rugg | 427/373 |
| 3,987,229 | 10/1976 | Rairdon | 428/522 |
| 4,128,688 | 12/1978 | Wiley | 428/315 |
| 4,129,676 | 12/1978 | Guglielmo, Sr. | 428/315 |
| 4,131,700 | 12/1978 | Guglielmo, Sr. | 428/315 |
| 4,175,154 | 11/1979 | Faust et al. | 428/313 |
| 4,176,210 | 11/1979 | Skinner | 428/315 |

FOREIGN PATENT DOCUMENTS 1143109 2/1969 United Kingdom ................... 428/315

*Primary Examiner*—William J. Van Balen
*Attorney, Agent, or Firm*—James Magee, Jr.; Joshua J. Ward

[57] ABSTRACT

Sheet vinyl covering material having a moisture permeable backing layer of material such as asbestos felt which is dimensionally stable under varying moisture conditions and resistant to degradation from water. The backing layer is sealed on one side with a layer of vinyl halide-vinylidene halide copolymer which is overlaid with a layer of open cellular foamed resinous material. The sheet vinyl laminate also has a resinous wear layer overlying the foamed layer.

7 Claims, 2 Drawing Figures

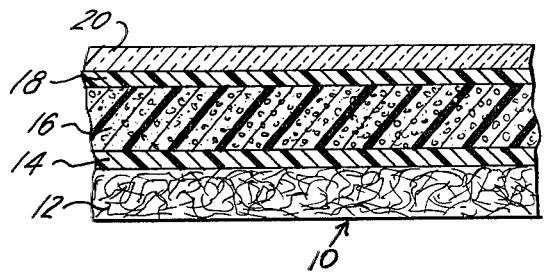
FIG.1
FIG. 2
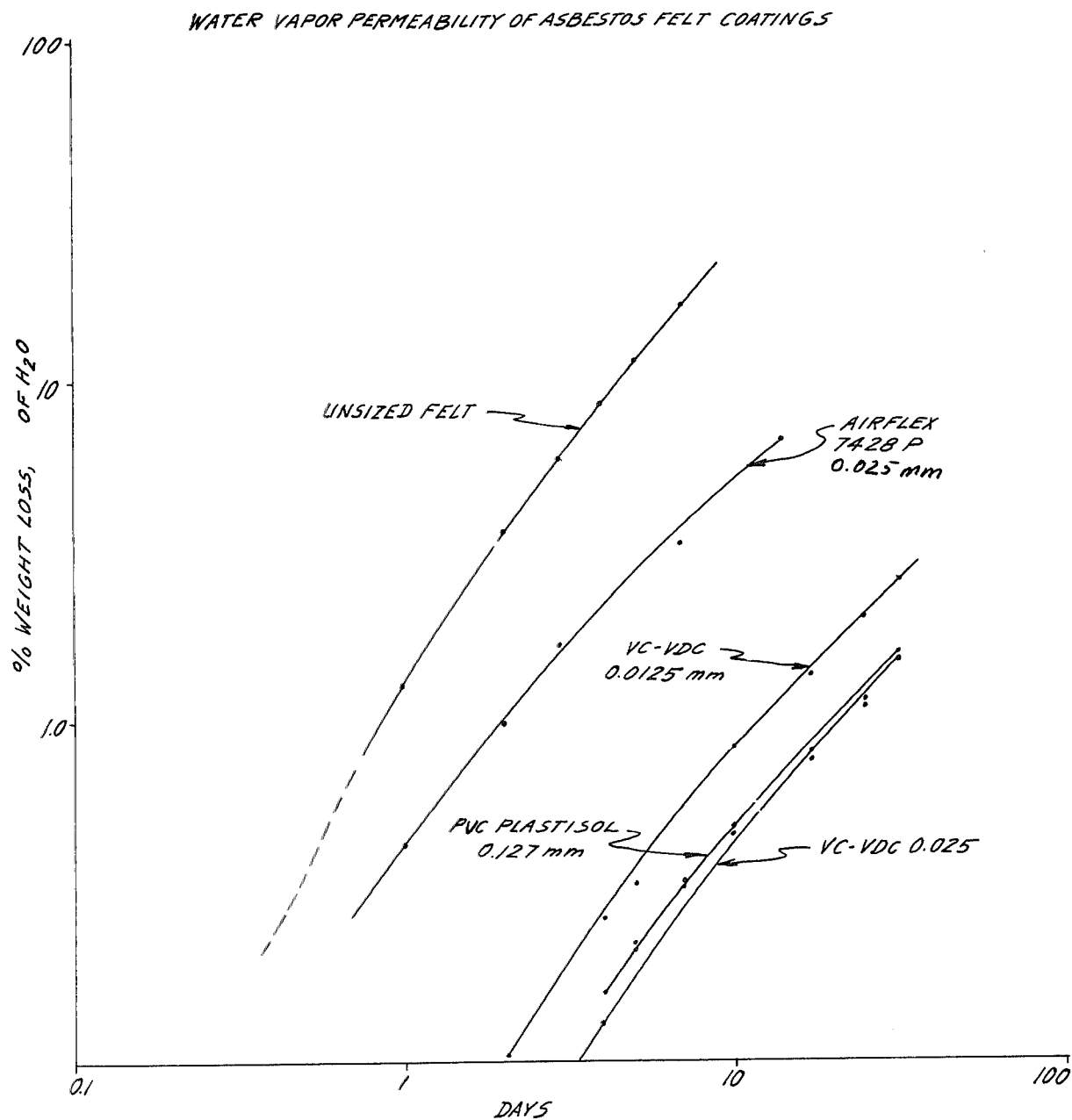

PERMEATION RESISTANT COVERING MATERIAL

BACKGROUND OF THE INVENTION

There has been a long felt need in the floor covering industry for a floor covering which can be applied directly to a concrete slab subject to moisture penetration. Some of the problems encountered with early materials such as degradation by moisture and lack of dimensional stability have been overcome by the use of sheet vinyl covering material having a substrate or backing layer of dimensionally stable materials such as asbestos felt or glass mat. The permeable nature of such substrates has however allowed moisture from the floor to penetrate through the substrate of the flooring material to intermediate layers thereof which frequently include an intermediate layer of foamed resinous material. Since such sheet vinyl materials usually have a plastic wear layer over the foamed layer, moisture migrating into the foamed layer from the concrete floor has tended to carry dissolved salts leached from the concrete into the foamed layer, because the wear layer is typically non-porous, such salts have tended to accumulate immediately beneath the wear layer thereby resulting in discoloration of printed patterns on the foamed layer and growth of unsightly fungi, etc.

One solution to these problems is suggested in U.S. Pat. No. 4,128,688, the disclosure of which is incorporated herein by reference. This patent describes a floor covering material of the general type described above in which a barrier layer overlies the moisture permeable backing layer with the barrier layer being dimensionally stable under varying moisture conditions and substantially impervious to moisture penetration. Polyvinyl chloride (PVC) resin together with plasticizer, heat and light stabilizer and fungicide is disclosed as being suitable for such a barrier layer. Barrier layers of the above mentioned patent are preferably applied over a latex seal coated asbestos felt backing with the barrier layer being applied preferably in thicknesses of approximately 0.5 millimeter.

SUMMARY OF THE INVENTION

It is an object of the present invention to provide an improved floor covering of the general type discussed above in which an improved seal coat is used on the moisture permeable backing layer so as to avoid the necessity for utilizing a separate barrier layer of the type contemplated by the above mentioned U.S. patent.

Product of the invention is sheet type covering material comprising:

(a) a moisture permeable backing layer which is dimensionally stable under varying moisture conditions and resistant to degradation from water;

(b) an intermediate open-cellular foamed resinous layer overlying the backing layer; and (c) a resinous wear layer overlying the intermediate layer, said backing layer being sealed at its surface adjacent the intermediate layer with a discrete continuous seal coat comprising vinyl halidevinylidene halide polymer. In preferred embodiments the backing layer is asbestos felt or fiberglass mat and the seal coat comprises vinyl chloride-vinylidene chloride copolymer or terpolymer.

DESCRIPTION OF DRAWINGS

FIG. 1 is a fragmentary sectional view through a preferred floor covering material of the invention. In this view it is not intended that the thicknesses of the various layers of the product shown are precisely represented; rather the various layers are represented on a considerably enlarged scale and without showing precise relationships between the thicknesses of the layers.

FIG. 2 is a graph showing water vapor permeability of asbestos felt sealed with various coatings including a coating according to the invention.

DETAILED DESCRIPTION OF THE INVENTION

Sheet vinyl covering material of the invention broadly comprises a backing layer of moisture permeable material such as asbestos felt or fiberglass mat which is dimensionally stable under varying moisture conditions and is resistant to degradation by water. An intermediate layer of resinous foam, such as vinyl foam, overlies the backing layer and a wear layer of clear plastic, such as vinyl or polyurethane materials, overlies the intermediate layer. The various layers may be embossed or non-embossed as desired and may or may not be pigmented or otherwise modified. Additional layers of pigment, crushed metal or other suitable materials, may be used as desired. Commonly, a multi-colored pattern is applied to the top of the intermediate foam layer. The dyes and inks commonly employed to print such patterns are frequently subject to degradation by water soluble alkaline salts bleached from concrete. The very nature of the permeable backing layers, such as asbestos felt and fiberglass mat, which are normally used, permits penetration of moisture from concrete floors through the backing layer and into and through the intermediate foamed layer. The mere treatment of the backing material to render it moisture impervious or the use of water impervious backing is not a satisfactory solution to this problem. Water impervious backings tend to cause water blisters to form between the floor covering and the concrete. The barrier layer suggested by U.S. Pat. No. 4,128,688 is one solution to this problem; however, the use of a barrier layer as described in the preferred embodiments of that patent is expensive and requires that the barrier layer be in addition to all of the normally used layers of material. The present invention achieves the advantages of a barrier layer without the necessity for applying a completely separate layer to the product. This is accomplished by use of the improved seal coat required by the present invention.

As mentioned above, the backing layer of product of the invention is moisture permeable and is dimensionally stable under varying moisture conditions as well as being resistant to degradation from water. Suitable backing layers include, for instance, fiberglass mat of appropriate density and thickness as well as asbestos felt backing. Suitable asbestos felt backing materials, as well as components of the products of the invention such as intermediate foam layers and wear layers, are well known in the art and are described for instance in U.S. Pat. Nos. 3,293,094, 3,458,337 and 3,408,248, the disclosures of which are incorporated herein by reference. While asbestos felt and glass mat is suitable, any moisture permeable material may be employed which is dimensionally stable under varying moisture conditions and is insoluble in water and resistant to degradation by water soluble salts, particularly alkaline salts, and fungi.

Suitable material must also be sufficiently mechanically strong to be processed in sheets and stable at process temperatures commonly employed to manufacture sheet vinyl flooring. Such temperatures are frequently on the order of 450° F. Nonasbestos felts of low cellulose content and compacted fiberglass mats are especially preferred.

Backing layers of product of the invention may be employed in a wide variety of thicknesses with layers having thickness between about 0.2 mm and about 1 mm being preferred.

In accordance with the invention, the water permeable backing layer is sealed at its surface adjacent to the intermediate foam layer with a discrete continuous vinyl halidevinylidene halide copolymer latex seal coat. This seal coat differs from conventional latex seal coat normally used on permeable backing layers in that is also functions to prevent migration of moisture from the permeable backing into the intermediate foam layer. Conventional latex seal coats are not sufficiently resistant to passage of moisture and are normally applied primarily to obtain a smooth surface on the backing layer. Since the primary purpose of a conventional seal coat is to obtain a smooth surface on the backing layer, conventional seal coats need not even provide a completely continuous layer of material on the backing layer. By contrast, the vinyl halide-vinylidene halide seal coat of the present invention is required to provide a discrete continuous layer which completely seals the upper surface of the backing layer against passage of moisture. While exact thickness of this layer is not critical, satisfactory results will normally be obtained with layers extending between about 0.01 and about 0.05 mm above the surface of the backing layer, it being understood that the seal coat may also penetrate the backing layer. Greater thicknesses of material can, of course, be used but are unnecessary and inefficent.

In contrast to conventional seal coats of acrylic latex, seal coats of the invention are vinyl halidevinylidene halide polymers with vinyl chloride-vinylidene chloride copolymers or terpolymers being preferred. Seal coats of the invention are in the form of water-surfactant latexes, of which the vinyl halide-vinylidene halide polymer preferably comprises at least about 50 wt% of the resinous portion of the latex and more preferably at least about 75 wt%. The latex itself may be of any suitable consistency with latexes containing between about 20 and about 80 wt% solids being preferred. Surfactant content of the latex is preferably in the range of between about 0.1 and about 10 wt% based on resin. Other ingredients, such as plasticizers, coelscing solvents, stabilizers, pigments, etc. may be present in amounts up to about 25 wt% based on resin.

Vinyl halide-vinylidene halide polymers used in products of the invention may be copolymers or may be terpolymer compounds including a third polymer component in addition to the vinyl halide and vinylidene halide. Such third component may for instance be an alkyl acrylate or a vinyl ester, such as vinyl acetate, or an alpha olefin such as styrene. Mixtures of suitable polymers may also be used. In any event the total amounts of the vinyl halide polymers used in the resinous portion of the seal coat are preferably as mentioned above, i.e., at least about 50 wt% of the resinous portion of the seal coat and more preferably at least about 75 wt% of the resinous portion. A suitable vinyl halide-vinylidene halide terpolymer latex is, for instance, marketed by B. F. Goodrich under the trade name "Geon 652". The resin portion of this latex comprises 15 wt% vinyl chloride, 70 wt% vinylidene chloride and 15 wt% acrylate and is used primarily to coat various textiles and fabrics.

For a better understanding of the invention, reference may be had to FIG. 1 of the accompanying drawings which shows a segment of vinyl floor covering 10 in accordance with the invention. The covering 10 has a substrate 12 of suitable material such as asbestos felt, sealed on the upper surface thereof with a 25 seal coat 14 of suitable vinyl halide-vinylidene halide polymer. Overlying the seal coat is an intermediate foam layer 16 of foamed vinyl resin having a decorative design printed thereon as layer 18. The top layer of the covering material is a conventional clear PVC wear layer 20.

The intermediate foam layer of product of the invention may comprise any of the foamed resinous material including any of the PVC resin materials normally used in connection with manufacture of sheet vinyl flooring and may specifically include, but is not limited to, those described in the above mentioned U.S. patents. Suitable wear layer materials may likewise include the various resinous materials including PVC plastisols and organosols described in greater detail in the above mentioned U.S. patents.

In preferred embodiments of the invention, the intermediate foamed layer is between about 0.2 and about 2 mm thick and the wear layer is between about 0.1 and about 0.5 mm thick.

Product of the invention may be formed in a conventional manner by use of conventional methods and apparatus well known in the industry. The various layers may, for instance, be applied by roll coating or knife coating and partially dried or gelled as appropriate prior to application of additional layers and complete drying or curing.

The following example illustrates the advantages of product of the invention without limiting the scope of the invention.

EXAMPLE

In order to demonstrate the ability of the vinyl halide-vinylidene halide seal coat layer of the invention to inhibit migration of moisture through a permeable backing layer without adverse effects on other desirable properties, samples of conventional 0.7 mm thick asbestos felt were coated with various coatings as described below. All coatings were latex coatings and were dried for 2 minutes at 275° F. Moisture vapor permeabilities were determined for the dried coated felt samples by cementing coated felt samples to the tops of 1 pint metal cans containing about 50 grams of water using epoxy cement. Permeation rate was determined by subsequent weight loss. The following coatings were tested: T,0120

Results of permeability testing of the coated asbestos felt samples described above are set forth in FIG. 2 with weight loss of water in percent being plotted against time in days. It can be seen from FIG. 2 that even a 0.0125 mm thick coating of vinyl halide-vinylidene halide polymer was substantially effective in reducing vapor migration and that a 0.025 mm thick coating of such material was even more effective than a 0.127 mm thick coating of conventional PVC plastisol in inhibiting vapor migration from the felt substrate.

While the invention has been described above with respect to preferred embodiments thereof, it will be understood by those skilled in the art that various changes and modifications may be made without departing from the spirit and scope of the invention.

What is claimed is:

1. Sheet-type covering material comprising:
   (a) a moisture permeable backing layer which is dimensionally stable under varying moisture conditions and resistant to degradation from water;
   (b) an intermediate open-cellular foamed resinous layer overlying the backing layer; and
   (c) a resinous wear layer overlying the intermediate layer;
   said backing layer being sealed at its surface adjacent the intermediate layer with a discrete continuous vinyl halidevinylidene halide polymer latex seal coat.

2. Material according to claim 1 in which the seal coat extends between about 0.01 and about 0.05 mm above the surface of the backing layer.

3. Material according to claim 2 wherein the vinyl halide-vinylidene halide polymer is vinyl chloride-vinylidene chloride polymer and the foamed resinous layer is foamed polyvinyl chloride plastisol or organosol.

4. Material according to claim 3 wherein the vinyl chloride-vinylidene chloride polymer is vinyl chloride-vinylidene chloride-acrylate terpolymer.

5. Material according to claim 2 wherein the intermediate layer is foamed polyvinyl chloride and the wear layer is polyvinyl chloride plastisol or organosol or polyurethane.

6. Material according to claim 3 wherein the backing layer is felt.

7. Material according to claim 3 wherein the backing layer is fiber glass mat.

* * * * *